United States Patent
Reid et al.

(10) Patent No.: US 6,387,449 B1
(45) Date of Patent: May 14, 2002

(54) REACTIVE HOT MELT ADHESIVE

(75) Inventors: Kevin J. Reid, White Bear Lake; Gary J. Haider, Maplewood; John M. Zimmel, St. Paul, all of MN (US)

(73) Assignee: H. B. Fuller Licensing & Financing, Inc., St. Paul, MN (US)

(*) Notice: Subject to any disclaimer, the term of this patent is extended or adjusted under 35 U.S.C. 154(b) by 0 days.

(21) Appl. No.: 09/453,361

(22) Filed: Dec. 1, 1999

(51) Int. Cl.⁷ .............................................. C09J 175/06
(52) U.S. Cl. ................... 427/385.5; 525/54.42; 525/54.44; 525/125; 525/131; 525/438; 525/440
(58) Field of Search ................... 525/125, 131, 525/438, 440, 54.42, 54.44; 427/385.5

(56) References Cited

U.S. PATENT DOCUMENTS

| | | |
|---|---|---|
| 3,767,040 A | 10/1973 | Tushaus |
| 4,775,719 A | 10/1988 | Markevka |
| 4,808,255 A | 2/1989 | Markevka |
| 5,472,785 A * | 12/1995 | Stobbie .................... 428/423.1 |
| 5,534,575 A | 7/1996 | Foster et al. |

FOREIGN PATENT DOCUMENTS

| | | |
|---|---|---|
| DE | 39 33 204 | 4/1991 |
| DE | 39 33 204 A | 4/1991 |
| EP | 0 420 246 | 4/1991 |
| JP | 53 065333 | 6/1978 |

* cited by examiner

*Primary Examiner*—Patricia A. Short
(74) *Attorney, Agent, or Firm*—Bin, Su; Allison A. Johnson

(57) ABSTRACT

A hot melt curing urethane adhesives with heat stability, green bond strength and fully cured bond strength that are surprisingly compatible in production and use. The reactive hot melt adhesive composition includes a composition including an isocyanate compound; a polyester-polyol compound; a reactive tackifying resin including non-polar polyols; and a thermoplastic polymer. The components of the adhesive composition cooperate in at least some embodiments to form a hot melt compatible adhesive composition that has substantial initial green strength, substantial cured bond strength, chemical and heat resistance when cured, extended pot life, long open times, high heat resistance, (i.e., high PAFT), and good adhesion to plastics.

37 Claims, No Drawings

REACTIVE HOT MELT ADHESIVE

FIELD OF THE INVENTION

The invention generally relates to reactive hot melt urethane adhesives. More particularly, the invention relates to a hot melt urethane adhesive including: an isocyanate compound; a polyester-polyol compound; a reactive tackifying resin including non-polar polyols; and a thermoplastic polymer.

BACKGROUND OF THE INVENTION

Both hot melt adhesives and moisture cure, hot melt urethane adhesives are well known generic adhesive classes. Hot melt adhesives can be conveniently applied by extruding the adhesive composition at elevated temperatures directly onto a work piece for the purpose of forming a structural bond with another work piece as the temperature of the adhesive compositional mass cools. While hot melt adhesives have many adhesive preparation and workpiece production benefits, they have an effective temperature use range which is lower than its application temperature. In other words, the bonding mass can lose bond strength as the temperature of the work piece and the bond line increase.

In sharp contrast, moisture curable, hot melt urethane adhesives have little green strength in the their open state, limited peel and shear strength after set and require curing before these properties improve. After application of a urethane adhesive, the joined workpieces can require external mechanical support until the urethane adhesive can cure to a strong resilient, crosslinked bondline. Cured polyurethane bonds have high tensile strength and maintain their strength above their application temperature, 100–130° C. Such adhesives have value where initial green strength is not important since substantial bond formation requires a period of curing time, which can range from hours to a number of days.

Clearly an adhesive displaying the high initial peel and shear strength of a hot melt which builds in strength over time is desirable. Early attempts to formulate such an adhesive have been made, notably attempts disclosed in U.S. Pat. Nos. 4,775,719 and 4,808,255, but none have been entirely successful. These early formulas set as a hot melt, but produced only modest increases in heat resistance when fully cured. This stems from the fact that only prepolymers made of non:polar polyols are compatible with APAO's, EVA and other commonly used hot melt polymers. Likewise the ingredients, which are used to modify and formulate hot polymers, are too non-polar to mix with most polyester or polyether based urethanes. The most polar hot melt ingredients contain carboxylic acids or high level of hydroxyl groups, which are unstable with NCO groups at elevated temperatures.

Some of these early adhesives result in adhesive formulations having good green strength, but short open times, low heat resistance as cured, (i.e., low peel adhesion failure temperature (PAFT)), and limited adhesion to plastics. Accordingly, a substantial need exists in finding better hot melt adhesive formulations.

SUMMARY OF THE INVENTION

The inventors have developed compatible blends of components that form hot melt curing urethane adhesives with heat stability, green bond strength and fully cured bond strength that are surprisingly compatible in production and use. The reactive hot melt adhesive composition of this invention includes an isocyanate compound; a polyester-polyol compound; a reactive tackifying resin including non-polar polyols; and a thermoplastic polymer. The components of the adhesive composition cooperate in at least some embodiments to form a hot melt compatible adhesive composition that has substantial initial green strength, substantial cured bond strength, chemical and heat resistance when cured, extended pot life, long open times, high heat resistance, (i.e., high PAFT), and good adhesion to plastics.

In at least one embodiment, the invention includes a hot melt adhesive composition including: an isocyanate compound; a polyester-polyol; a reactive tackifying resin which includes a terpene-phenolic copolymer resin having a hydroxyl number of about 50 or less; and a thermoplastic polymer.

In at least one embodiment, the invention includes a method of increasing temperative resistance and open time in a hot melt adhesive composition, the method including incorporating into the adhesive an isocyanate compound; a polyester-polyol, and a reactive tackifying resin including a non-polar polyol having a hydroxyl number of about 50 or less.

DETAILED DESCRIPTION OF THE INVENTION

The inventors have found useful hot melt adhesive compositions that include: an isocyanate compound; a polyester-polyol compound; a reactive tackifying resin including non-polar polyols; and a thermoplastic polymer.

Isocyanate Compounds

The term "isocyanate compound" in the context of this invention indicates a typically monomeric small molecule having 2 or more NCO groups. Isocyanate compounds useful for forming the compositions of the invention include organic, aliphatic and aromatic isocyanate compounds having an isocyanate functionality of about 2 or more. The isocyanate compounds can also contain other substituents which do not substantially adversely affect the viscosity of the isocyanate terminated compositions, the adhesive properties of the bond line or the reactivity of the NCO groups during the formation of the composition. The isocyanate compound can also include mixtures of both aromatic and aliphatic isocyanates and isocyanate compounds having both aliphatic and aromatic character.

Typical aromatic isocyanate compounds include diphenylmethane diisocyanate compounds (MDI) including its isomers, carbodiimide modified MDI, diphenylmethane-4, 4'-diisocyanate, diphenylmethane-2,2'-diisocyanate, diphenyl-methane-2,4'-diisocyanate, oligomeric phenyl methylene isocyanates; toluene diisocyanate compounds (TDI) including isomers thereof, tetramethylxylene diisocyanate (TMXD), isomers of naphthylene diisocyanate, isomers of triphenylmethane triisocyanate, and mixtures thereof. Aliphatic di, tri, and polyisocyanates are also useful including for example isophorone diisocyanate, hydrogenated aromatic diisocyanates, aliphatic polyisocyanates, cycloaliphatic polyisocyanates, and others.

Polyester-Polyol Compounds

The polyester-polyol compounds can be produced by reacting polyols with a polyfunctional carboxylic acid compound.

Suitable polyols that can be used as reactants to form the polyester-polyols have a molecular weight in excess of 250, more typically in excess of 500, most preferably in the molecular weight range of about 500–10,000. Typical polyols include monomeric diols, triols, etc. and polymeric diols, triols comprising a chain of repeating methylene units providing a major contribution to the molecular weight of the material. A typical polymeric polyol includes either a linear or branched chain of the repeating units which is terminated with hydroxyl groups and for the sake of simplicity these hydroxyl groups will normally be the active hydrogen containing substituents in the polyol structure reacting with the capping isocyanate compounds.

Preferred polyols include monomeric polyols having 2 or 3, hydroxyl groups per molecule. Representative, but exclusive examples include ethylene glycol, propylene glycol, glycerine, trimethylol propane, 1,2,6-hexane triol, butene diol, 1,4-butanediol, 1,3-propanediol, neopentyl glycols.

Some preferred polyols include hexane diol, higher polyalkylene diols, cyclic polyols containing 1 to 3 -hydroxyl groups and a cycloaliphatic structure. Examples of such preferred diols include 1,4-dihydroxymethyl cyclohexane, hydrogenated bisphenol-A, hexane diol, dodecane diol, or other higher molecular weight diols. Especially preferred polyols include neopentyl glycols.

Under certain conditions release of vaporized isocyanate compositions can occur during manufacture or application of the adhesive of the invention. In order to reduce isocyanate volatility, a small amount of a low moleoular weight polyol can be added, with the polyester-polyol, that can react with free isocyanate compounds.

The polyester-polyols can be produced by reacting the above discussed polyols with a polyfunctional carboxylic acid compound, preferably a higher ($C_8$ or higher) paraffinic diacid. Such polyfunctional acids are primarily monomeric compositions having two or more carboxylic acid groups. Representative examples of such acids include dodecane dioic acid, azelaic acid, sebacic acid, 1,18-octadecane dioic acid, dimer acid prepared from a mono-, di- or triunsaturated fatty acid, acid wax, acid anhydride grafted wax, or other suitable polycarboxylic acid reacting compound.

A preferred polyester-polyol for use in this invention includes the reaction product of dimer acid and either a 1,4-dihydroxyalkyl cyclohexane or hydrogenated bisphenol-A, dimer acid being a composition made by reacting active olefinic groups in a $C_{12-24}$ unsaturated fatty acid resulting in crosslinking between two fatty acid molecules.

In the reactive hot melt of this invention the isocyanate compound reacts with the terminal hydroxyl group to form isocyanate terminated compositions having free NCO groups for reaction with moisture or other reactive hydrogen containing compounds. In at least some embodiments, only the polyester-polyol is reacted with the isocyanate compounds and the tackifying resins to produce the hot melt adhesive.

In at least some other embodiments, however, a mixture of the above discussed polyester-polyol compounds with polyether-polyol compounds may be used. In these embodiments, an appropriate amount of the polyester-polyol compound used is replaced with an appropriate amount of a suitable polyester-polyol compound to form a mixture of polyester-polyol compounds and polyether-polyol compounds. This mixture of polyester-polyol /polyether-polyol compounds is then used to react with the isocyanate compounds and the tackifying resins to produce the hot melt adhesive. The ratio of polyester-polyol to polyether-polyol in these mixtures is preferably in the range of about 10:1 to about 1:5, and more preferably about 5:1 to about 1:2.

Suitable polyether-polyol compounds for use in such a mixture have two or more hydroxyl groups in the molecule. Preferably, the polyether-polyol compounds are diols or triols of a molecular weight resulting in an appropriate viscosity. Typically, suitable polyether-polyol compounds have a molecular weight of less than about 20,000, or typically less than about 10,000, preferably in the range of about 1,000 to about 10,000, and most preferably for reasons of reactivity and viscosity control, in the range of about 2,000 to about 4,000. Examples of preferred polyether-polyol compounds include polyoxyallylene compounds having at least two hydroxyl groups in the molecule, and polyalkylene ether glycol compounds. Specific examples of suitable polyether-polyol compounds include polyethylene glycols, polypropylene glycols, tetramethylene glycols, polybutylene glycols, and mixtures thereof.

Reactive Tackifying Resin

The adhesives of the invention also contain a reactive tackifying resin. The inventors have found that in at least some embodiments, when used with the urethane components discussed above, such reactive tackifying resin can increase the PAFT values of the urethane adhesive, and extend the open time of the polymers without compromising heat stability. The reactive tackifying resins also increase the viscosity of liquid components.

The reactive tackifying resins are preferably non-polar polyols, which are solid at ambient temperatures, and preferably have the following characteristics: functionality between 1 and 2.5; hydroxy numbers in the range of about 50 or less and preferably in the range of about 50 to about 30; soften points above 0° C. and preferably in the range of 50° C. to 130° C.; acid numbers below 1; and are non-polar. (i.e., able to form compatible and stable blends when co-reacted with the above discussed pre-polymers.)

Examples of suitable reactive tackifying resins include: terpene-phenols, low acid number reaction products of rosin acid and diepoxies, and hydroxyl modified rosin esters. Especially preferred reactive tackifying resins include terpene-phenols with hydroxy numbers in the range of about 20 and about 50.

Below is a table containing some commercially available useful reactive tackifying resins:

| Supplier | Product Number | CAS Number | Chemical Description |
|---|---|---|---|
| Arakawa | KE-601 | Not Registered | Rosin acid/diepoxy |
| Arakawa | KE-615-3 | Not Registered | Rosin acid/diepoxy |
| Arakawa | KE-622 | Not Registered | Rosin acid/diepoxy |
| Arakawa | KE-624 | Not Registered | Rosin acid/diepoxy |
| DRT (Les Derives Resiniques et Terpeniques) | Reagem 5006 | 68038-31-3 | Hydroxy modified rosin ester |
| DRT (Les Derives Resiniques et Terpeniques | Reagem 5045 | 68038-31-3 | Hydroxy modified rosin ester |
| DRT (Les Derives Resiniques et Terpeniques | Reagem 5110 | 68038-31-3 | Hydroxy modified rosin ester |
| Hercules | Neopol 20-28LC | Not Registered | Hydroxy modified rosin ester |
| Hercules | Neopol RH-97MNC | Not Registered | Hydroxy modified rosin ester |

-continued

| Supplier | Product Number | CAS Number | Chemical Description |
|---|---|---|---|
| Hercules | Neopol RH-201C | Not Registered | Hydroxy modified rosin ester |
| Hercules | Neopol RH-61C | Not Registered | Hydroxy modified rosin ester |
| DRT (Les Derives Resiniques et Terpeniques) | T115 | 25359-84-6 | 50 OH# terepene/ phenol |

Thermoplastic Polymer Component

The reactive hot melt urethane adhesive composition of the invention contains a compatible thermoplastic polymer which cooperates with the other adhesive components to provide initial green strength and cured strength to the inventive compositions. Preferably, the thermoplastic polymer composition is matched in polarity with the urethane components and with the tackifying resins. The preferred thermoplastic copolymer component of this invention includes an ethylene vinyl monomer polymer such as an ethylene vinyl acetate copolymer, an ethylene acrylic monomer copolymer, or ethylene acrylic carbon-monoxide copolymer.

The polyethylene-vinyl monomer composition can be a film-forming thermoplastic polymer compatible with the adhesive components of the invention. Preferably the vinyl monomer of the ethylene vinyl monomer composition comprises an acrylate monomer or a vinyl ester monomer of a carboxylic acid compound. Acrylate monomers that can be used in the film-forming polymer of the invention include acrylic acid, methacrylic acid, acrylamide, methacrylamide, methylacrylate, ethyl acrylate, methylmethacrylate, 2-ethylhexylacrylate, 2-ethylhexylmethacrylate, methoxyethylmethacrylate, methoxyethylacrylate, ethylene n-butyl acrylate, and others. A preferred acrylate monomer is ethylene n-butylacrylate which includes about 30–50% butylacrylate. Acrylate monomers are well known in the art and are selected for copolymerization with ethylene based on the polarity of the monomer. Vinyl esters of carboxylic acids include such monomers as vinyl acetate, vinyl butyrate, and others.

The preferred isocyanate capped components of this invention are formulated to have a polarity compatible with ethylene-vinyl acetate polymers (EVA) having about 10–60 wt-% vinyl acetate and a melt index of about 0.2 to 1000. The most preferred EVA comprises a copolymer with about 18 to 50 wt-% vinyl acetate and a melt index of about 0.2 to 500. The compositions of polymers using other second monomer systems should be formulated to obtain a polarity approximating the polarity of these EVA compositions.

Non-Reactive Tackifying Resin

The adhesives of the invention may optionally contain a non-reactive tackifying resin in combination with the isocyanate, the polyester-polyol, the reactive tackifying resin and the thermoplastic polymer. The non-reactive tackifying resins useful in adhesives of the invention comprise aromatic, aliphatic or aliphatic aromatic tackifying resins.

Aromatic resins useful in forming the adhesive compositions of this invention can be prepared from any monomer containing an aromatic moiety and a polymerizable ethylenically unsaturated group. Typical examples of aromatic monomers include styrenic monomers such as styrene, alpha-methyl styrene, vinyl toluene, methoxy styrene, tertiary butyl styrene, chlorostyrene, etc., indene monomers including indene, methylindene and others. Aliphatic aromatic tackifying resins can be made by polymerizing feed streams containing a mixture of one or more aliphatic monomers in combination with one or more aromatic monomers. Typically aromatic aliphatic resins can be formed from the aromatic monomers above in mixture with generally unsaturated petroleum feedstocks which contain $C_4$+monomers.

The mixed aromatic-aliphatic resins contain aromatic monomers recited above polymerized with aliphatic monomers, preferably with the $C_{4-6}$ monomers recited below.

Both natural and synthetic terpene tackifying resins and synthetic aliphatic hydrocarbon resins can be used in the compositions of the invention as non-reactive tackifying agents.

Typical monomers making up aliphatic hydrocarbon resins include 1,3-butadiene, cis-1,3-pentadiene, trans-1,3-pentadiene, 2-methyl-1,3-butadiene, 2-methyl-2-butene, cyclopentadiene, dicyclopentadiene, and others.

In at least some embodiments, the preferred non-reactive tackifying resin used depends upon the type of thermoplastic polymer used. For example, in at least some embodiments the preferred non-reactive tackifying resin may depend upon the wt-% VA content of the EVA if EVA is used as the thermoplastic polymer. For example, for EVA resins having a wt-% of VA greater than 28–33%, aromatic or aliphatic-aromatic resins having a ring and ball softening point of 70°–120° C. are preferred. For EVA resins having a wt-% of VA less than 28% aliphatic or aliphatic-aromatic resins having a ring and ball softening point of 70–120° C. are preferred. Preferred resins are generally $C_9$ and hydrogenated $C_9$ resins. In some embodiments pure monomer resins -methyl styrene can be used, but it may shorten open times in final materials. Additionally, pure monomer resins may have some compatibility problems at 33% VA EVA and below.

The ratio of the tackifying resins (both reactive and non-reactive) in relation to the thermoplastic polymer can effect the open time and initial peel resistance of the adhesive before the adhesive moisture cures. At any urethane component level, increasing the tackifying resin to thermoplastic polymer ratio will lengthen the open time. For open times beyond 1 minute, the tackifying resin to thermoplastic polymer ratio is preferably greater than 1, and is more preferably between 2 and 3. Additionally, resins which have good initial peel resistance have tackifying resin to thermoplastic polymer ratios that yield tan deltas of 0.50 to less than 1.00 upon cooling from the melt as measured by dynamic mechanical analysis (DMA).

The compositions of the invention can contain other compatible polymers, fillers, pigments, dyes, catalysts, inhibitors, antioxidants, UV absorbers, waxes and other conventional additives. The fillers may be in the form of particles or fibers of compositions including ceramics, glass, silica, quartz, mica, treated clay, titanium dioxide, boron nitrides, graphite, carbon black, glass fibers, asbestos fibers, metal powders, etc., the amount of filler depending on particular properties of the composite desired.

In somewhat greater detail, the reactive hot melt urethane adhesives of at least some embodiments of the invention typically comprise an effective bonding amount of a thermoplastic polymer base to provide initial green strength, an effective amount of a polyurethane composition including the reaction product of (i) a polyester polyol compound, and (ii) an isocyanate compound to provide final cured strength, and chemical and heat resistance; a reactive tackifying resin to provide for increased open times, and increased PAFT values; and a compatible tackifying resin. The reactive hot melt urethane adhesive composition is typically blended under anhydrous inert gas mixing conditions to form a uniform adhesive admixture which is then typically packaged in a variety of sizes ranging from about 25 g. to 250 kilogram mixtures. In use the compositions can be placed in hot melt application equipment under an inert gas blanket, heated to melt temperature for extrusion.

The reactive hot melt urethane adhesive compositions of the invention can be cured in the bond line using a variety of mechanisms. The curing reaction occurs between a compound having an available active hydrogen atom and the NCO groups of the polyurethane precursor. A variety of reactive compounds having free active hydrogens are known in the art including water, hydrogen sulfide, polyols, ammonia, and other active compounds. Such curing reactions can be conducted by relying on the presence of moisture in the atmosphere.

Typically the adhesive compositions of this invention can be prepared using the proportions of components found in the following Table 1:

TABLE 1

| Component | Typical Adhesive wt. % | Preferred Adhesive wt. % | Most Preferred Adhesive wt. % |
|---|---|---|---|
| Isocyanate Compound | 7–18 | 10–18 | 13–15 |
| Polyester-polyol Compound (or optional mixture of polyester-polyol and polyether-polyol) | 23–52 | 30–52 | 37–45 |
| Reactive Tackifying Resin | 20–25 | 5–25 | 5–20 |
| Thermoplastic Polymer | 15–35 | 15–25 | 15–22 |
| Non-Reactive Tackifying Resin | 0–20 | 10–20 | 10–20 |

In at least some embodiments, the weight ratio of the combined weight of the polyester-polyol and isocyanate components in relation to the reactive tackifying resin is about 1:1 to about 4:1, preferably about 2:1 to about 3:1.

While the choice of component, order of addition, and addition rate can be left to the skilled adhesives chemist, generally the reactive hot melt urethane adhesives of this invention can be made by preparing the polyester-polyol compound (or mixture of polyester-polyol and polyether polyol) and blending the polyester-polyol (or mixture of polyester-polyol and polyether polyol) with the reactive tackifying resin, the thermoplastic polymer and other optional ingredients such as the non-reactive tackifying agent, if necessary, into a suitable reaction vessel at elevated temperatures, typically in the range of 100°–250° F. (38°–122° C.). The isocyanate compound is then introduced into the reaction vessel at elevated reaction temperatures, typically in the range of 100°–300° F. (38°–149° C.). Moisture is typically excluded from reaction using dry chemicals and conducting the reaction under vacuum or the presence of an anhydrous gas blanket.

The polyester polyol compound (or the mixture of polyester-polyol/polyether-polyol) is reacted with the isocyanate compound in the reactive vessel at ratios that typically depend on the hydroxy and isocyanate functionality of the reactants. Typically the compounds are reacted at ratios which result in a reaction between isocyanate groups and hydroxy groups leaving essentially no residual hydroxy and minimal isocyanate functionality, typically less than 10 wt-%. Typically the reaction between the polyester polyol compound (or mixture of polyester-polyol and polyether polyol) and the isocyanate compound is conducted at an OH:NCO ratio of about 0.75 to 0.16:1 in order to obtain an NCO concentration in the final adhesive of about 1 to 5%. Typically the resulting urethane material is titrated to measure residual concentration of isocyanate using ASTM D-2572-80 "Standard method for isocyanate group and urethane materials or prepolymers". If the prepolymer composition has acceptable viscosity and isocyanate content, it can be packaged in suitable moisture resistant containers or immediately blended with the balance of the components to form the finished adhesive of the invention.

The adhesives of the invention can be formed into a single package combining the polyester polyol compound (or mixture of polyester-polyol and polyether polyol), isocyanate compound, the reactive tackifying resin, the thermoplastic polymer, and any optional components, such as the non-reactive tackifying agent. Typically the combination can be made with standard batch or continuous industrial reaction or blending equipment having suitable agitation, temperature control, vacuum and inert atmosphere. Again, in the formation of the finished adhesive composition, blending of the individual components can be left to the skilled adhesives formulator. The components are mixed at a rate such that the ingredients are smoothly combined.

The hot melt adhesives of the invention can be used in accordance with uses generally known in the art for hot melt adhesives. For example, the adhesive can be used as adhesives in roll coating applications, such as panel assembly operations, or as sealants, such as sealants around windows, and a broad variety of other such applications. The adhesive can be conveniently applied directly onto a substrate at elevated temperature for the purpose of forming a structural bond with another substrate as the temperature of the adhesive compositional mass cools. Before curing, the adhesive generally exhibits sufficient green strength such that external mechanical support is not needed while the adhesive cures. Once the adhesive cures, it binds the two substrates firmly together.

The invention may be further clarified by reference to the following Examples, which serve to exemplify some of the preferred embodiments, and not to limit the invention.

EXAMPLES

Testing Methods
1. Method Used to Determine %NCO

To determine the percent NCO (%NCO), samples were reacted with known, excess amount of di-n-butyl amine in toluene, then back titrated with HCL to determine the %NCO. This procedure was performed generally in accordance with ASTM D-2572-80.

2. Dynamic Mechanical Analysis (DMA)

DMA is a non-destructive test that characterizes the rheological properties of materials over a temperature or frequency (stress) range. A DMA cooldown test was used. Samples were warmed to 250° F. for ½–1 hour until molten. Molten sample was placed on a rheometrics dynamic spectrometer (RDS) model DMA with 25° C. present sample chamber and a parallel plate gap of 2mm, the chamber was closed, and testing began at 1 radians/seconds. We measured G', G", G* in dynes/cm$^2$ and tan Λ as a function of time over 10–20 minutes. As used herein: G' is the storage modules; G" is the loss modules; G* is the sum of G' and G"; and tan Λ is the ratio of G'/ G". Generally, if tan Λ is greater than 1.0, the material can flow (i.e. has not set). If the tan Λ is less than 1.0, the material can not flow and is set. Therefore, the tan Λ generally indicates the limit on open time. Additionally, to determine wetting properties, we correlate DMA curves and open times. Good wetting occurs in a material having a tan Λ greater than or equal to 2.0 and G* less than 2*10$^5$ dynes/cm$^2$. We have also found that after cooling at 25° C., material having a tan Λ of 0.3 and below did not have good peel strengths.

3. Peel Adhesion Failure Temperature (PAFT) Testing

To test the PAFT of the sample adhesive, a 1 Kg PAFT test was used. Samples were warmed to 250° F. along with a 10ML drawdown bar. Adhesive was applied to the end of a 1×4 inch piece of #10 canvas and drawn to 10 mls. Two pieces of preapplied canvas were mated and rolled, nominal thickness of 20 mls. Samples were moisture cured for 2–3 weeks in a 75° F. 50% RH environment. After curing, the samples were randomly placed in a programmable Tenney™ oven, Tenney Engineering, Union, N.J., to trigger on one end a 1 Kg weight, the top end attached to a switch which records the temperature when the sample fails. The oven is programmed for 25° C./hr. temperature increase. The maximum temperature is 175° C. Each PAFT value is the average of 5–7 samples. Many samples were tested twice and are the average of these runs.

Preparation of Polyester-Polyol Components

Two polyester-polyol compounds, were produced as follows, and used as components in the examples shown.

Polyester-Polyol Compound 1

Polyester-polyol compound 1 was prepared as follows: 290 grams of Empol™ 1018, an 18 carbon dimer acid available from Emery Division of Henkel Corp. located in Cincinnati, Ohio, and 71 grams of neopentyl glycol were charged in a flask equipped with a mechanical stirrer and a Dean-Stark trap for collecting water from the condensation reaction. The reaction was carried out at a temperature in the range of 100° C. to 140° C. under a 28 in. Hg vacuum for 4–6 hours until the acid number was below 0.80. This produced a 55 hydroxyl number polyester-polyol.

Polyester-Polyol 2

Polyester-polyol 2 was prepared as follows. The reactants, 290 grams of Empol™ 1061, a dimer acid available from the Emery Division of Henkel Corp. located in Cincinnati, Ohio, and 71 grams of neopentyl glycol were charged in a flash equipped with a mechanical stirrer and a Dean-Stark trap for collecting water from the condensation reaction. The reaction was carried out at a temperature in the range of 100° C. to 140° C. under a 28 in. Hg vacuum for 4–6 hours until the acid number was below 0.80. The resultant polyol had a hydroxyl number of 55.

Comparative Working Examples, 1–9

Example 1

77.7 grams of polyester-polyol Compound 2 was mixed with 66.0 grams of thermoplastic polymer (specifically 28% VA EVA 150 Melt Index (MI), ATEVA 2830A, from AT Plastics Canada) and 132.0 grams of a non-reactive tackifying resin, (specifically, Escorez 5615 which is a 115° C. Ring & Ball Softening Point, C9 hydrocarbon resin from Exxon Corp.) at 225° F. under 28in Hg. for ½ hours. 24.3 grams of isocyanate compound, (specifically, pure MDI, Isonate 125M Dow Chemical Company, Midland, Mich.) was then added and reacted under vacuum at 200–215° F. for 1 ½–3 hours. 1 to 2 drops of a catalyst, (specifically Jeffcat DMDEE 1–2 drop<0.03% of total sample) was added to the sample. Viscosity at 250° F. was 7–10K cps.

Example 2

91.5 grams of polyester-polyol compound 2 was mixed with: 72.0 grams ATEVA 283A (thermoplastic polymer); 108.0 grams Escorez 5615 (non-reactive tackifying resin), 28.5 grams Isonate 125M (isocyanote compound); and 1–2 drops (~0.02%) Jeffcat DMDEE (catalyst). The components were mixed according to the same general procedure as in example 1.The viscosity at 250° F. was 10K cps.

Example 3

91.5 grams of polyester-polyol compound 2 was mixed with: 90.0 grams ATEVA 283A (thermoplastic polymer); 90.0 grams Escorez 5615 (non-reactive tackifying resin); 28.5 grams Isonate 125M (isocyanate compound); and 1–2 drops (~0.02%) Jeffcat DMDEE (catalyst) according to the same general procedure as in example 1. The viscosity at 250° F. was 14K cps.

Example 4

90.7 grams of polyester-polyol compound 2 was mixed with: 77.0 grams ATEVA 2830A (thermoplastic polymer); 154.0 grams Kristlex 3085, which is an 85° C. R&B softening point polystyrene resin from Hercules, (non-reactive tackifying resin); 28.3 grams Isonate 125M (isocyanate compound); and 1–2 drops (~0.02%) Jeffcat DMDEE (catalyst). The components were mixed according to the same general procedure as in example 1. Viscosity at 250° F. was 8K cps.

The time tan δ≦1.0 and the PAFT values of the above examples 1–4 were measured using the testing methods described above and are shown in the following table.

TABLE 2

| Example # | wt. % of combined polyester-polyol and isocyanate components | (thermoplastic polymer)/ (non-reactive tackifying resin) | Time tanδ ≦ 1.0 | PAFT (° F.) |
| --- | --- | --- | --- | --- |
| 1 | 34 | 0.5 | 3–4 minutes | 140–145 |
| 2 | 40 | 0.67 | 90–100 seconds | — |
| 3 | 40 | 1.0 | <20 seconds | — |
| 4 | 34 | 0.5 | Too fast to measure | — |

The above examples show some of the limits of early attempts to formulate hot melt adhesives as taught by U.S. Pat. No. 4,808,255. Examples 2 and 3 specifically show the effect of EVA/resins on open time. Example 4 shows that high aromatic resins have short open times even at low EVA/resin ratios.

Example 5

114.3 grams of polyester-polyol compound 2 was mixed with: 90.0 grams ATEVA 283A (thermoplastic polymer); 60.0 grams Escorez 5615 (non-reactive tackifying resin); 35.7 grams Isonate 125M (isocyanate compound); and 1–2 drops (~0.02%) Jeffcat DMDEE (catalyst). The components were mixed according to the same general procedure as in example 1. Viscosity at 250° F. was 13K cps.

Example 6

114.3 grams of polyester-polyol compound 2 was mixed with 90.0 grams Elvaloy HP-771 which is a 100 MI, Ethylene, n-butyl acrylate, carbon monoxide polymer from DuPont (thermoplastic polymer component); 60.0 grains Escorez 5615 (non-reactive tackifying resin component); 35.7 grams Isonate 125M (isocyanate compound) and 1–2 drops (~0.02%) Jeffcat DMDEE (catalyst). The components were mixed according to the same general procedure as example 1.

The viscosity at 250° F. was 19.5K cps.

Example 7

91.5 grams of polyester-polyol compound 2 was mixed with: 90.0 grams Elvaloy HP-771 (thermoplastic polymer); 90.0 grams Escorez 5615 (non-reactive tackifying resin); 28.5 grams Isonate 125M (isocyanate compound); and 1–2 drops (~02%) Jeffcat DMDEE (catalyst). The components were mixed according to the same general procedure as in example 1. The viscosity at 250° F. was 23K cps.

The time tan $\delta \leq 1.0$ and the PAFT values of examples 5-7 were measured using the testing methods discussed above, and are shown in Table 3.

TABLE 3

| Example # | wt. % of combined polyester-polyol and isocyanate components | (thermoplastic polymer)/ (non-reactive tackifying resin) | Time tan$\delta \leq 1.0$ | PAFT (° F.) |
|---|---|---|---|---|
| 5 | 50 | 1.5 | Too fast to measure | — |
| 6 | 50 | 1.5 | 90–100 seconds | — |
| 7 | 40 | 1.0 | 100–120 seconds | 180 |

Examples 5-7 show that Elvaloys have longer open times than EVAs.

Example 8

104.3 grams of polyester-polyol compound 1 was mixed with: 90.0 grains Elvaloy HP-771 (thermoplastic polymer); 60.0 grams Escorez 5615 (non-reactive tackifying resin); 45.7 grams Isonate 125M (isocyanate compound); and 1–2 drops (0.02%) Jeffcat DMDEE (catalyst). The components were mixed according to procedure as example 1. The viscosity at 250° F. was 19K cps., and the measured PAFT was 174° F.

Example 9

83.4 grams polyester-polyol compound 1 was mixed with: 90.0 grams Elvaloy HP-771 (thermoplastic polymer); 60.0 grams Escorez 5615 (non-reactive tackifying resin); 36.6 grams Isonate 125M (isocyanate compound); and 1–2 drops (0.02%) Jeffcat DMDEE (catalyst). The components were mixed according to the same general procedure as example 1. The viscosity at 250° F. was 22.5K cps., and the measured PAFT was 178° F.

Reactive Resin Working Examples with Comparisons. 10-28

Example 10

152.4 grams of polyester-polyol compound 2 was mixed with: 120.0 grams Sylvares TP-2019, which is a 75-100 OH# terprene/phenol from Arizona Chemical (reactive tackifying resin); 80.0 grams ATEVA 2830A (thermoplastic polymer); and 47.6 grams Isonate 125M (isocyanate compound). The compounds were mixed according to the same general procedure as used in example 1. The viscosity at 225° F. was 33.5K, and the viscosity rate change at 225° F. was 10% per hour increase.

Example 11

152.4 grams of polyester-polyol compounds 2 was mixed with: 120.0 grams SP-553, which is a 75-100 OH# terpene/phenol from Reichhold Chemical (reactive tackifying resin); 80.0 grams ATEVA 2830A (thermoplastic polymer); and 47.6 grams Isonate 125M (isocyanate compound). The components were mixed according to the same general procedure as used in example 1. The viscosity at 225° F. was 33.5K cps, and the viscosity rate increase at 225° F. was 11% per hour.

Example 12

152.4 grams polyester-polyol compound 2 was mixed with: 100.0 grams Elvaloy HP-771 (thermoplastic polymer); 100.0 grams Dertophene T, which is a 30-40 OH#, 90-95° C. R&B softening point terphene/pheno from DRT France (reactive tackifying resin); 47.6 grams Isonate 125M (isocyanate compound); and 1–2 drops Jeffcat DMDEE (catalyst). The components were mixed according to the same general procedure as used in example 1. The viscosity at 250° F. was 14K cps, and the viscosity rate increase at 250° F. was 5.4% per hour.

Example 13

152.4 grams polyesterpolyol compound 2 was mixed with: 100.0 grams Elvaloy HP-771 (thermoplastic polymer); 100.0 grams Dertophene T-105, which is a 35-45 OH#, 105° C. R&B softening point terphene/phenol from DRT France (reactive tackifying resin); 47.6 grams Isonate 125M (isocyanate compound); and, 1–2 drops Jeffcat DMDEE (catalyst). The components were mixed according to the same general procedure as used in example 1. Viscosity at 250° F. was 12K cps, and the viscosity rate increase at 250° F. was 6.5% per hour.

Example 14

152.4 grams polyester-polyol compound 2 was mixed with: 100.0 grams Elvaloy HP-771 (thermoplastic polymer); 100.0 grams Dertophene T- 115, which is a 40-50 OH#, 115° C. R&B softening point terphene/phenol from DRT France (reactive tackifying resin); 47.6 grams Isonate 125M (isocyanate compound); and, 1–2 drops Jeffcat DMDEE (catalyst). The components were mixed according to the same general procedure as used in example 1. Viscosity at 250° F. was 19K cps, and the viscosity rate increase at 250° F. was 3.6% per hour.

Example 15

139.1 grams polyester-polyol compound 1 was mixed with: 100.0 grams Elvaloy HP-771 (thermoplastic polymer); 100.0 grams Dertophene T - 115 (reactive tackifying resin); 60.9 grams Isonate 125M (isocyanate compound); and 1–2 drops Jeffcat DMDEE (catalyst). The components were mixed according to the same general procedure as used in example 1. The viscosity at 250° F. was 20K cps, and the viscosity rate increase at 250° F. was 5.4% per hour. The measured %NCO was 3.8–3.9, and the measured PAFT was 200–215° F.

Example 16

139.1 grams polyester-polyol compound 1 was mixed with 80.0 grams Elvax 150 which is 33% VA EVA, 43 MI from DuPont (thermoplastic polymer); 120.0 grams Escorez 5615 (non-reactive tackifying resin); and 60.9 grams Isonate 125M (isocyanate compound). The components were mixed according to the same general procedure as used in example 1. The viscosity at 250° F. was 1K cps, and the viscosity rate increase at 250° F. was 2% per hour. The measured PAFT was 138° F.

Example 17

208.6 grams polyester-polyol 1 was mixed with: 120.0 grams Elvax 150 (thermoplastic polymer); 180.0 grams Dertophene T-115 (reactive tackifying resin); 91.4 grams Isonate 125M (isocyanate compound); and 1–2 drops Jeffcat DMDEE (catalyst). The components were mixed according to the same general procedure as used in example 1. Viscosity at 250° F. was 23.5K cps, and the viscosity rate increase at 250° F. was 6.2% per hour. The measured PAFT was 154° F.

Example 18

208.6 grams of polyester-polyol 1 was mixed with: 120.0 grams Elvax 150 (thermoplastic polymer); 120.0 grams Dertophene T-115 (reactive tackifying resin); 60.0 Excorez 5615 (non-reactive tackifying resin); 91.4 grams Isonate 125M (isocyanate compound); and, 1–2 drops Jeffcat DMDEE (catalyst). The components were mixed according to the same general procedure as in example 1. Viscosity at 250° F. was 14.5K cps, the viscosity rate increase at 250° F. was 3.4% per hour, and the measured PAFT was 190° F.

Example 19

208.6 grams of polyester-polyol compound 1 was mixed with: 120.0 grams Elvax 150 (thermoplastic polymer); 100.2 grams Dertophene T-115 (reactive tackifying resin); 79.8 grams Escorez 5615 (non-reactive tackifying resin); 91.4 grams Isonate 125M (isocyanate compound); and 1–2 drops Jeffcat DMDEE (catalyst). The viscosity at 250° F. was 17.7K cps, and the measured PAFT was 175–205° F.

The PAFT values of examples 16–19 was measured according to the methods discussed above, and are shown in Table 4 below:

TABLE 4

Elvax 150 Samples

| Example # | wt. % of combined polyester-polyol and isocyanate components | wt % Total Tackifying Resin** | (combined polyester-polyol and isocyanate components)/ (reactive tackifying resin) | PAFT (° F.) |
|---|---|---|---|---|
| 16 | 50 | 30 | 0 | 135 |
| 17 | 50 | 30 | 1.67 | 154 |
| 18 | 50 | 30 | 2.5 | 190 |
| 19 | 50 | 30 | 3.0 | 175–210 |

**Dertophene T-115 + Escorez 5615

Example 20

118.0 grams of polyester-polyol compound 1 was mixed with: 28.0 grams Arakawa KE-601 which is a 110 OH#, rosin acid modified diol, 80° C. R&B softening point from Arakawa of Japan (reactive tackifying resin); 100.0 grams Elvaloy HL-771 (thermoplastic polymer); 100.0 grams Escorez 5615 (non-reactive tackifying resin); 54.0 grams Isonate 125M (isocyanate compound); and 1–2 drops Jeffcat DMDEE (catalyst). The components were mixed according to the same general procedure as example 1. Viscosity at 250° F. was 15.6K cps. Viscosity rate increase at 250° F. was 2% per hour. 210° F. PAFT.

Example 21

139.1 grams of polyester-polyol compound 1 was mixed with: 100.0 grams Elvaloy HL-771 (thermoplastic polymer); 100.0 grams Escorez 5615 (non-reactive tackifying resin); 60.0 grams Isonate 125M (isocyanate compound); and 1–2 drops Jeffcat DMDEE (catalyst). The components were mixed according to the same general procedure as in Example 1. Viscosity at 250° F. was 16.3K cps. 172° F. PAFT.

TABLE 4

Reactive Resin Comparation

| Example # | wt. % of combined polyester-polyol, isocyanate, and reactive tackifying resin (if present) | Reactive Tackifying Resin Present? | Time tanδ ≦ 1.0 | PAFT (° F.) |
|---|---|---|---|---|
| 20 | 50 | Yes | 400–500 seconds | 210 |
| 21 | 50 | No | 200 seconds | 172 |

Example 22

212.4 grams of polyester-polyol compound 1 was mixed with: 50.4 grams Arakawa KE-601 (reactive tackifying resin); 150.0 grams Elvaloy HL-771 (thermoplastic polymer); 90.0 grams Escorez 5615 (non-reactive tackifying resin); 97.2 grams Isonate 125M (isocyanate compound); and 1–2 drops Jeffcat DMDEE (catalyst). The components were mixed according to the same general procedure as in Example 1. Viscosity at 250° F. was 9.5K cps. 210–220° F. PAFT.

Example 23

170.3 grams of polyester-polyol compound 1 was mixed with: 85.3 grains Arakawa KE-601 (reactive tackifying resin); 150.0 grams Elvaloy HL-771 (thermoplastic polymer); 90.0 grams Escorez 5615 (non-reactive tackifying resin); 104.4 grams Isonate 125M (isocyanate compound); and 1–2 drops Jeffcat DMDEE (catalyst). The components were mixed according to the same general procedure as in Example 1. Viscosity at 250° F. was 26K cps. 230 . 245° F. PAFT.

Example 24

250.4 grains of polyester-polyol compound 1 was mixed with: 150.0 grams Elvaloy HL-771 (thermoplastic polymer); 90.0 grams Escorez 5615 (non-reactive tackifying resin); 109.6 grams Isonate 125M (isocyanate compound); and 1–2 drops Jeffcat DMDEE (catalyst). The components were mixed according to the same general procedure as in Example 1. Viscosity at 250° F. was 11.5K cps. 190–195° F. PAFT.

TABLE 5

Comparison of Reactive to Non-reactive Resins in High Polyester-Polyol and Isocyanate Content Formulas

| Example # | wt. % of combined polyester-polyol, isocyanate, and reactive tackifying resin (if present) | Polyester-Polyol/KE-601 | Time tanδ ≤ 1.0 | PAFT (° F.) |
|---|---|---|---|---|
| 22 | 60 | 4.2 | >3,000 seconds | 210–220 |
| 23 | 60 | 2.0 | 800–1,000 seconds | 230–245 |
| 24 | 60 | — | 40–60 seconds | 190–195 |

Example 25

122.8 grams of polyesterpolyol compound 1 was mixed with: 30.8 gram Reagem 5110 which is a 100° C. R&B softening point, 75 OH#, rosin modified polyol from DRT France (reactive tackifying resin); 132.0 grams ATEVA 2830A (thermoplastic polymer); 264.0 grams Escorez 5615 (non-reactive tackifying resin); 50.5 grams of Isonate 125 (isocyanate component) and 1–2 drops Jeffcat DMDEE (catalyst). The compounds were mixed according to the same general procedure as in Example 1. The viscosity at 250° F. was 17 Kcps, there was <3% viscosity increase at 250° F., and 127° F. PAFT.

Example 26

148.8 grams polyester-polyol compound 1 was mixed with: 74.4 gram Reagem 5006 which is a 6° C. R&B softening point, 75 OH#, rosin modified polyol from DRT France (reactive tackifying resin); 150.0 grams Elvaloy HL-771 (thermoplastic polymer); 150.0 grains Escorez 5615 (non-reactive tackifying resin); 76.8 grams Isonate 125M (isocyanate compound) and 1–2 drops Jeffcat DMDEE (catalyst). The compounds were mixed according to the same general procedure as in Example 1. Viscosity at 250° F. was 23K cps, and 145° F. PAFT.

Example 27

217.6 grams of polyester-polyol compound 1 was mixed with: 54.4 gram Reagem 5110 (reactive tackifying resin); 120.0 grams Elvaloy HL-771 (thermoplastic polymer); 120.0 grams Escorez 5615 (non-reactive tackifying resin); 88.9 grams Isonate 125M (isocyanate compound); and 1–2 drops Jeffcat DMDEE (catalyst). The components were mixed according to the same general procedure as in Example 1. Viscosity at 250° F. was 16.8K cps, and 188° F. PAFT.

Example 28

180.5 grams of polyesterpolyol compound 1 was mixed with: 45.3 gram Reagem 5110 (reactive tackifying resin); 150.0 grams Elvaloy HL-771 (thermoplastic polymer); 150.0 grams Escorez 5615 (non-reactive tackifying resin); 74.4 grams Isonate 125M (isocyanate compound); and 1–2 drops Jeffcat DMDEE (catalyst). The components were mixed according to the same general procedure as in Example 1. Viscosity at 250° F. was 29.5K cps, and 159° F. PAFT.

Reactive Resin Working Examples Using Mixtures of Polyester-Polyol and Polyether-Polyol as Components of the Compositions, 29–32

In the following Examples 29–30, a mixture of polyesterpolyol and polyether polyol was used instead of straight polyether-polyol. Examples 29 and 30 are similar to example 1, but instead of straight polyester-polyol Compound 2, a $50/50$ mixture of polyester-polyol Compound 2 and a polyether polyol compound was used.

Example 29

77.7 grams of polyester-polyol Compound 2 and 77.7 grams of 2,000 Mwt teteramethylene glycol, trade name Terathane 2,000 from the DuPont (polyether-polyol compound) were mixed with: 132 grams ATEVA 2830A (thermoplastic polymer); 264 grams Escorez 5615(non-reactive tackifying resin); 48.6 grams Isonate 125M (isocyanate compound); and 1–2 drops (0.02%) Jeffcat DMDEE (catalyst). The components were mixed according the same general procedure as used in example 1. The viscosity at 250° F. was 30.3K cps.

Example 30

77.7 grams of polyesterpolyol Compound 2 and 77.7 grams POLY G 20–56, a 2000 Mwt. polypropylene glycol from Arch Chemical, formerly Olin Chemical (polyether-polyol compound) was mixed with: 132 grams ATEVA 2830 (thermoplastic polymer); 264 grams Escorez 5615(non-reactive tackifying resin); 48.6 grams Isonate 125M (isocyanate compound); and 1–2 drops (0.02%) Jeffcat DMDEE (catalyst). The components were mixed according to the same general procedure as used in example 1. The viscosity at 250° F. was 15.9K cps.

Examples 31 and 32 are similar to example 15, but instead of straight polyester-polyol Compound 2, a $50/50$ mixture of polyester-polyol Compound 2 and a polyether polyol compound was used.

Example 31

125.2 grams polyester-polyol compound 1 and 125.2 grams Terathane 2000 (polyether-polyol compound) was mixed with: 120 grams Elvaloy HP-771 (thermoplastic polymer); 120 grams Dertophene T-115(reactive tackifying resin); 109.7 grams Isonate 125M (isocyanate compound); and 1–2 drops (0.02%) Jeffcat DMDEE (catalyst). The components were mixed according to the same general procedure as used in example 1. The viscosity at 250° F. was 7.2K cps.

Example 32

113.4 grams polyester-polyol compound 1 and 180 grams 4000 MWt. Polypropylene glycol, trade name Acclaim 4200 from Lyondell Chemical (polyether-polyol compound) was mixed with: 133.2 grams Elvaloy HP-771(thermoplastic polymer); 66.6 grams Dertophene T-115 (reactive tackifying resin); 106.8 grams Isonate 125M (isocyanate compound); and 1–2 drops (~0.02%) Jeffcat DMDEE (catalyst). The components were mixed according to the same general procedure as used in Example 1. The viscosity at 250° F. was 3.3K cps.

In each of Examples 29–32, the sample were stable at 250° F., and showed no signs of separation upon standing for 2–3 hours at 250° F. This is a good sign of compatibility.

The invention resides in the following claims.
We claim:
1. A hot melt adhesive composition comprising:
   (a) an isocyanate compound;
   (b) a polyester-polyol;
   (c) a reactive tackifying resin comprising a non-polar polyol having a hydroxyl number of about 50 or less; and
   (d) a thermoplastic polymer.
2. The composition of claim 1, wherein the composition further comprises a polyether-polyol.
3. The composition of claim 2, wherein the polyether-polyol has an average molecular weight in the range from 1,000 to 10,000.
4. The composition of claim 2, wherein the polyether-polyol is elected from the group consisting of polyethylene glycols, polypropylene glycols, tetramethylene glycols, polybutylene glycols, and mixtures thereof.
5. The composition of claim 2, wherein the ratio of polyester-polyol and the polyether-polyol is in the range of 10:1 to 1:5.
6. The composition of claim 1, which further comprises a non-reactive tackifying resin.
7. The composition of claim 6, wherein the non-reactive tackifying resin is an aliphatic or aliphatic-aromatic hydrocarbon resin.
8. The composition of claim 1, wherein the polyester-polyol is a reaction product of a poly-functional carboxylic aid compound and an aliphatic or cycloaliphatic diol or triol compound.
9. The composition of claim 8, wherein the polyfunctional carboxylic acid compound is an aliphatic dicarboxylic acid compound.
10. The composition of claim 9, wherein the aliphatic dicarboxylic compound is a dimer fatty acid.
11. The composition of claim 8, wherein the aliphatic diol is neopentyl glycol.
12. The composition of claim 1, wherein the thermoplastic polymer comprises an ethylene vinyl monomer copolymer composition.
13. The composition of claim 12, wherein the ethylene vinyl monomer copolymer composition comprises an ethylene vinyl acetate composition.
14. The composition of claim 13, wherein the ethylene vinyl acetate comprises 18 to 46 wt-% vinyl acetate.
15. The composition of claim 1, wherein the thermoplastic polymer comprises an ethylene n-butyl acrylate composition.
16. The composition of claim 15, wherein the ethylene n-butyl acrylate comprises 30 to 50 wt-% butylacrylate.
17. A composition of claim 1 comprising:
   (a) from about 7 to about 18 wt-% of the isocyanate compound;
   (b) from about 23 to about 52 wt-% of the polyester-polyol, or a mixture of polyester-polyol and a polyether-polyol;
   (c) from about 5 to about 25 wt-% of the reactive tackifying resin;
   (d) from about 15 to about 35 wt-% of the thermoplastic polymer; and
   (e) from 0 to about 20 wt-% of a non-reactive tackifying resin.
18. The composition of claim 1, wherein the weight ratio of the combined weight of the polyester-polyol and isocyanate components in relation to the reactive tackifying resin is about 2:1 to about 3:1.
19. The composition of claim 2, wherein the weight ratio of the combined weight of the polyester-polyol, the polyether-polyol and the isocyanate components in relation to the reactive tackifying resin is about 2:1 to about 3:1.

20. A method of bonding at least two surfaces which comprises applying to at least one surface an effective bonding amount of the adhesive of claim 1 and curing the adhesive.
21. The hot melt adhesive composition of claim 1 wherein said hot melt adhesive has increased temperature resistance.
22. The hot melt adhesive composition of claim 1 wherein said hot melt adhesive has increased open time.
23. The hot melt adhesive of claim 1 wherein said reactive tackifying resin is selected from the group consisting of a terpen-phenolic copolymer resin, a rosin acid/diepoxy, a hydroxy modified rosin ester and mixtures.
24. The hot melt adhesive of claim 1 wherein said reactive tackifying resin is present in at least 30% by weight.
25. A hot melt adhesive composition comprising:
   (a) an isocyanate compound;
   (b) a polyester-polyol;
   (c) a reactive tackifying resin comprising a non-polar polyol, wherein the reactive tacking resin is selected from the group consisting of a terpene-phenolic copolymer resin, a rosin acid/diepoxy, a hydroxy modified rosin ester and mixtures thereof, and (d) a thermoplastic polymer.
26. The composition of claim 25, wherein tie terpene-phenolic copolymer resin has a hydroxyl number between about 50 and 30.
27. The hot melt adhesive composition of claim 25 wherein said hot melt adhesive has increased open time.
28. The hot melt adhesive composition of claim 25 further comprising anon-reactive tackifying resin.
29. A method of increasing temperature resistance and open time in a hot melt adhesive composition, the method comprising incorporating into said adhesive an isocyanate compound, a polyester-polyol, and a reactive tackifying resin comprising a non-polar polyol having a hydroxyl number about 50 or less.
30. The method of claim 29, wherein the polyester-polyol is a reaction product of a dimer fatty acid and an aliphatic diol.
31. The method of claim 29, wherein the non-polar polyol has a hydroxyl number in the range of about 50 and about 30.
32. The method of claim 29, wherein the weight ratio of the combined weight of the polyester-polyol and isocyanate components to the reactive tackifying resin is about 2:1 to about 3:1.
33. The method of claim 29, wherein said reactive tackifying resin is selected from the group consisting of terpene-phenolic copolymer resin, a rosin acid/diepoxy, a hydroxy modified rosin ester and mixtures thereof.
34. A process for making a hot melt adhesive composition, the process comprising:
   (a) providing a polyester-polyol component;
   (b) adding to the polyesterpolyol component a reactive tackifying resin comprising a non-polar polyol having a hydroxyl number of about 50 or less and a thermoplastic polymer to form a first mixture; and thereafter
   (c) adding an isocyanate compound to the first mixture.
35. The process of claim 34, wherein step (b) further includes adding a non-reactive tackifying agent.
36. The process of claim 34, wherein the providing step includes providing a polyester-polyol compound or a mixture of a polyester-polyol compound and a polyether-polyol compound.
37. The process of claim 34 wherein said reactive tackifying resin is selected from the group consisting of a terpene-phenolic copolymer resin, a rosin acid/diepoxy, a hydroxy modified rosin ester and mixtures.

* * * * *

UNITED STATES PATENT AND TRADEMARK OFFICE
CERTIFICATE OF CORRECTION

PATENT NO.     : 6,387,449 B1
DATED          : May 14, 2002
INVENTOR(S)    : Kevin J. Reid, Gary J. Haider and John M. Zimmel It is certified that error appears in the above-identified patent and that said Letters Patent is hereby corrected as shown below:

Column 2,
Line 54, "(TMXD)" should be -- (TMXDI) --

Column 4,
Line 11, "polyoxyallylene" should be -- polyoxyalkylene --

Column 5,
Line 9, "terepene/" should be -- terpene/ --

Column 10,
Line 12, "isocyanote" should be -- isocyanate --

Column 11,
Lines 8 and 45, "grains" should be -- grams --

Column 12,
Lines 37 and 49, "terphene" should be -- terpene --

Column 13,
Line 9, "was 1K cps" should be -- was 11K cps --

Column 14,
Line 23, "Comparation" should be -- Comparison --
Lines 50 and 60, "grains" should be -- grams --

UNITED STATES PATENT AND TRADEMARK OFFICE
CERTIFICATE OF CORRECTION

PATENT NO. : 6,387,449 B1
DATED : May 14, 2002
INVENTOR(S) : Kevin J. Reid, Gary J. Haider and John M. Zimmel It is certified that error appears in the above-identified patent and that said Letters Patent is hereby corrected as shown below:

Column 17,
Line 16, "elected" should be -- selected --.
Line 29, "aid" should be -- acid --.

Column 18,
Line 11, "terpen-phenolic" should be -- terpene-phenolic --
Line 24, "tie" should be -- the --.

Signed and Sealed this

Eighth Day of April, 2003

JAMES E. ROGAN
*Director of the United States Patent and Trademark Office*